(12) United States Patent
Sahagun

(10) Patent No.: US 11,803,701 B2
(45) Date of Patent: Oct. 31, 2023

(54) MACHINE LEARNING OPTIMIZATION OF MACHINE USER INTERFACES

(71) Applicant: KYOCERA Document Solutions, Inc., Osaka (JP)

(72) Inventor: Allan Sahagun, Oakland, CA (US)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 0 days.

(21) Appl. No.: 17/685,708

(22) Filed: Mar. 3, 2022

(65) Prior Publication Data

US 2023/0281381 A1   Sep. 7, 2023

(51) Int. Cl.
| | | |
|---|---|---|
| *G06F 3/0481* | (2022.01) | |
| *G06F 40/186* | (2020.01) | |
| *G06V 10/82* | (2022.01) | |
| *G06V 10/774* | (2022.01) | |

(52) U.S. Cl.
CPC .......... *G06F 40/186* (2020.01); *G06V 10/774* (2022.01); *G06V 10/82* (2022.01)

(58) Field of Classification Search
CPC ..... G06F 40/186; G06V 10/774; G06V 10/82
See application file for complete search history.

(56) References Cited

U.S. PATENT DOCUMENTS

| | | | | |
|---|---|---|---|---|
| 10,459,938 B1 * | 10/2019 | Agnew | ................. | G06F 3/0482 |
| 10,459,939 B1 * | 10/2019 | Agnew | ................. | G06T 11/206 |
| 10,853,380 B1 * | 12/2020 | Agnew | ............... | G06F 16/2428 |
| 10,861,202 B1 * | 12/2020 | Agnew | ............... | G06F 16/9535 |
| 11,037,342 B1 * | 6/2021 | Agnew | ............... | G06F 3/04847 |
| 11,222,453 B1 * | 1/2022 | Aupetit | ................. | G06F 3/0486 |
| 2008/0295038 A1 * | 11/2008 | Helfman | ................. | G06F 16/44 715/853 |
| 2010/0169792 A1 * | 7/2010 | Ascar | ................... | G06F 11/3438 715/744 |
| 2012/0120086 A1 * | 5/2012 | Dang | ..................... | G06F 16/904 345/589 |
| 2014/0019461 A1 * | 1/2014 | Bredenberg | ........... | G06Q 30/02 707/754 |
| 2015/0066579 A1 * | 3/2015 | de Paris | ............. | G06Q 30/0201 705/7.29 |
| 2017/0052747 A1 * | 2/2017 | Cervelli | ................ | G06T 11/001 |
| 2017/0221238 A1 * | 8/2017 | Limberger | ............ | G06T 15/005 |

(Continued)

FOREIGN PATENT DOCUMENTS

| | | | | |
|---|---|---|---|---|
| AU | 2014235416 B2 * | 4/2017 | ............. | G09G 3/001 |
| CN | 113377853 A * | 9/2021 | | |

(Continued)

OTHER PUBLICATIONS

NPL_RoddenEtAl_Measuring the User Experience on a Large Scale User Centered Metrics for Web Applications.

*Primary Examiner* — Hassan Mrabi
(74) *Attorney, Agent, or Firm* — Rowan TELS LLC

(57) ABSTRACT

A method of evolving web pages or forms to better accord with usability metrics involves generating a heat map encoding of user interaction with a web page or electronic form, transforming the heat map with a machine neural network or other machine learning algorithm into at least one visual element placement prioritization for the web page or electronic form, and applying the visual element placement prioritization to modify a layout of the web page or electronic form.

18 Claims, 12 Drawing Sheets

(56) References Cited

U.S. PATENT DOCUMENTS

| | | | |
|---|---|---|---|
| 2018/0014067 A1* | 1/2018 | Schwartz | H04N 21/422 |
| 2018/0197199 A1* | 7/2018 | Bartz Vieira de Oliveira | G06Q 30/0254 |
| 2020/0019549 A1* | 1/2020 | Agnew | G06T 11/206 |
| 2020/0125481 A1* | 4/2020 | Walber | G06F 11/3676 |
| 2020/0174996 A1* | 6/2020 | True | G06F 11/3438 |
| 2021/0157312 A1* | 5/2021 | Celia | G06N 3/02 |
| 2022/0108495 A1* | 4/2022 | Krishnamoorthy | G06V 10/82 |
| 2022/0113991 A1* | 4/2022 | Singh | G06F 11/3438 |

FOREIGN PATENT DOCUMENTS

| | | | | |
|---|---|---|---|---|
| EP | 3133510 A1 * | 2/2017 | | G01C 21/3667 |
| FR | 3005368 A1 * | 11/2014 | | G06T 11/206 |
| WO | WO-2016135536 A1 * | 9/2016 | | G06F 17/00 |

\* cited by examiner

MACHINE LEARNING OPTIMIZATION OF MACHINE USER INTERFACES

BACKGROUND

The design of user interfaces to control and to receive information from machines may be improved by tracking historical usage patterns coupled with target outcomes that are defined while a system is being designed. Many user interfaces include some level of user tracking to determine, for example, where web page activity occurs, the flow of traffic on a website, and how users navigate between web pages.

Conventionally, this synthesis between tracking and design is performed manually, with some amount of automatic data collection and visualization to aid the synthesis. There is a need for greater automation of such synthesis utilizing artificial intelligence configured with best design practices targeting particular user outcomes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 depicts a system 600 in accordance with one embodiment.

DETAILED DESCRIPTION

Figure 1:
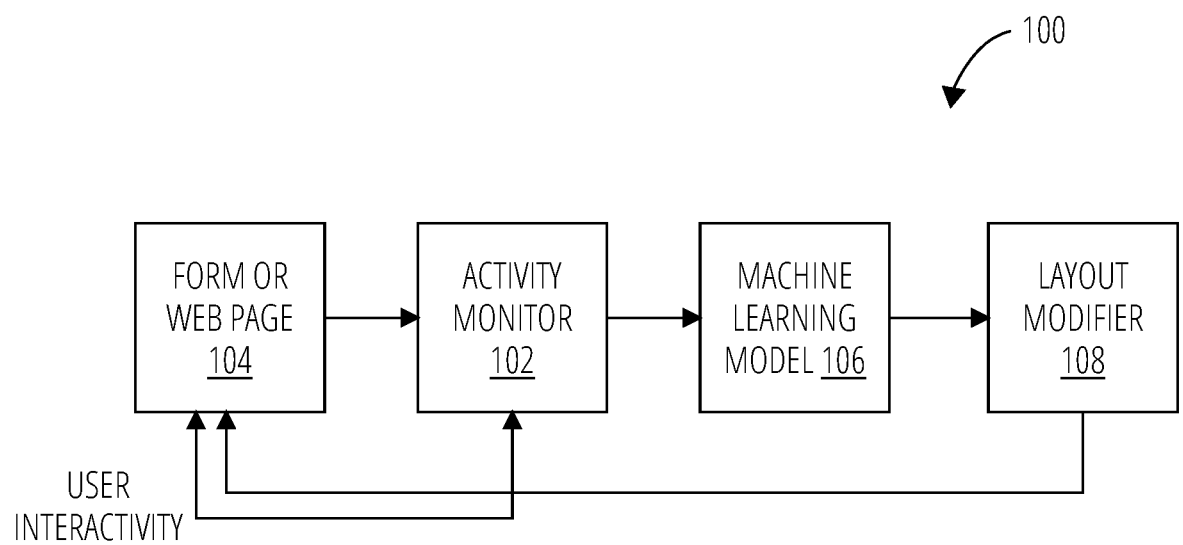
FIG. 1 depicts a system 100 in accordance with one embodiment.

The following description may make reference to certain terms as follows. Other terms should be accorded their ordinary meaning in the art unless otherwise indicated by context.

User interface: An organization of graphical elements on a display, some of which are typically operable to influence the actions of a machine (e.g., mobile phone, tablet, or computer).

PULSE: Metric set used, for example, to guide marketing decisions (acronym for Page views, Uptime, Latency, Seven day active users, Earnings).

HEART: User-centered metrics for qualifying web applications (acronym for Happiness, Engagement, Adoption, Retention, Task Success).

Page views: Number of times a web page or form is viewed (engaged with by users).

Uptime: Amount of time a website is functioning (i.e. "up") and available to end users.

Latency: The lag or load time of a web site.

Seven day active users: The number of users engaging with a system over the course of seven consecutive days.

Heat map: A quantification and localization of where engagement occurs on a web page or form. Generally, a heat map is a mechanism for recording a distribution of a quantity, such as (here) engagement frequency with elements of a user interface spatial layout.

The layout of web pages or forms is dynamically modified by a machine learning model (e.g., a convolutional neural network) based on processing of a heat map of user engagement, and further influenced by a usability map that may reflect desired outcomes for user engagement. The feedback control loop thus formed enables the automatic generation of base templates for web pages or forms for particular desired usage/engagement scenarios. In one embodiment the system utilizes metrics such as PULSE and HEART to train a convolutional neural network to drive the evolution of web site and form layouts.

User engagement information for a web page or form may be collected by tracking the placement of clicks, hoverovers, navigation between pages, and other user activity. These signals are transformed into a heatmap input to a machine learning model such as a convolutional neural network.

The system may learn from models based on best industry practices (such as HEART/PULSE) and generate and display different iterations of a page/form to validate or invalidate decisions on the positioning, ordering, and placement of specific visual elements (both operable elements and informational-only elements). A pre-configured desired interactivity outcome (e.g., in the form of a usability map) may influence these decisions as well as the type and nature of engagement data collection and measurement. The usability map may incorporate settings for particular types of users (e.g., based on level of proficiency in some area, or based on preferred outcomes for certain types of people-gamers, children, men, women, etc.).

The disclosed mechanisms increase the automation of and reduce the development time for more effective user interfaces in conformance with specific pre-configured desired outcomes. The disclosed systems may automatically execute tests, collect data, compare the data with desired outcomes defined by best user interface practices, and apply the collected data to improve the layout of said interfaces to align desired outcomes with high-traffic areas of the interface display.

FIG. 1 depicts a system 100 in one embodiment. The system 100 comprises an activity monitor 102 for a form or web page 104. The measured activity is provided to a machine learning model 106 that drives a layout modifier 108 to change the size and/or position of visual elements on the form or web page 104.

Figure 2:
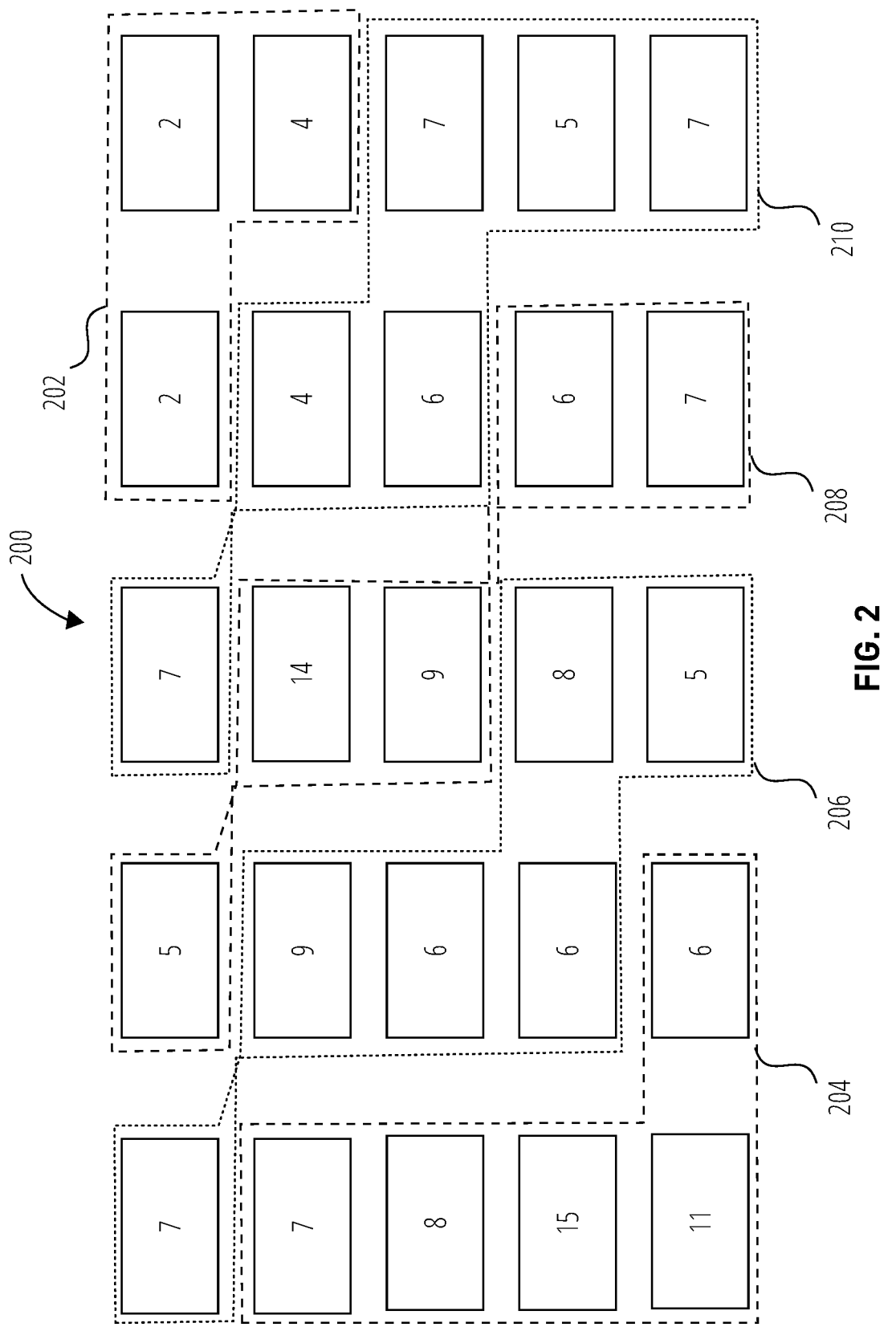
FIG. 2 depicts an example of a heat map 200.

FIG. 2 depicts an example of a heat map 200. A desired outcome for a web page or form may indicate that the visual elements in element set 202 should be the most highly prioritized for interaction. However, the heat map for actual usage of the page or form indicates that the element set 202 is least interacted with set of visual elements. In this example, the numbers on each visual element indicate on-mouse activity (e.g. both click and hover) user engagement with that element. The machine learning model might then detect a poor match between the heat map of actual engagement, and usability map for desired engagement/best practices with which it was trained, and may provide layout change priorities to a layout modifier. The layout modifier may swap the position of the elements in element set 202 with those in more highly engaged regions of the page/form, such as those in element set 204, or distribute the layout of the element set 202 across the highest-engagement element blocks of element set 204, element set 206, element set 208, and element set 210.

Figure 3:
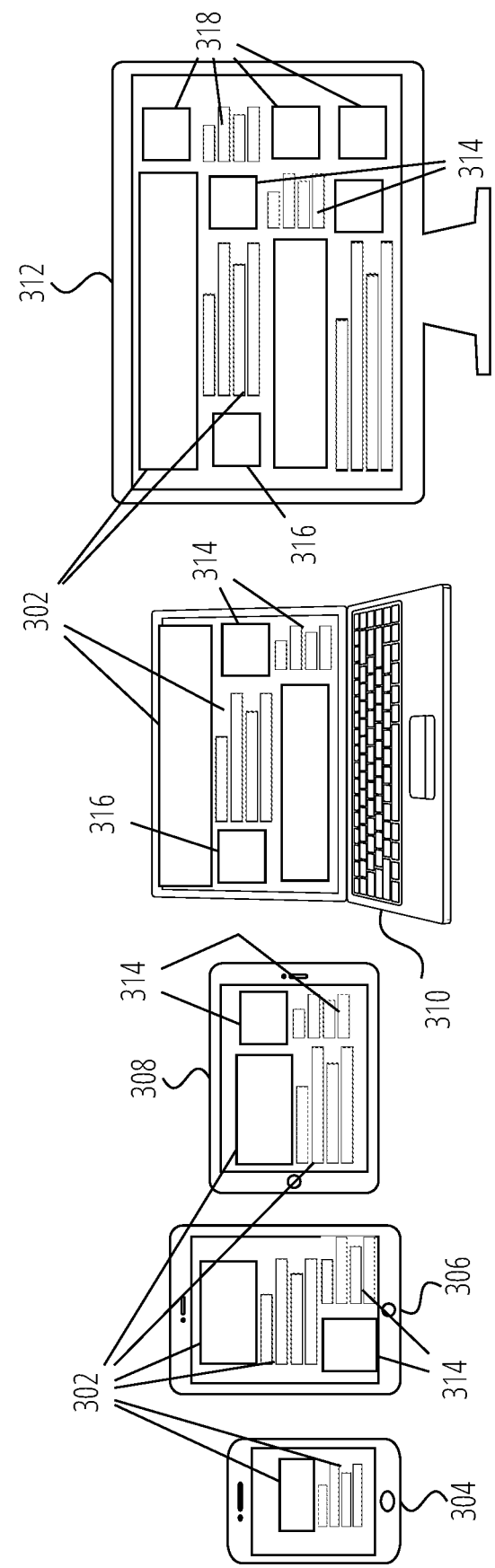
FIG. 3 depicts example web page or form layout on different form-factor displays.

FIG. 3 depicts an example of layouts adapted to different display form factors. Visual elements with the highest engagement (elements 302) may be prioritized for display on limited display real estate (e.g., on a mobile phone display 304 or a tablet horizontal display 306/tablet vertical display 308), and may further receive priority placement (in the most engaged regions) as the display area becomes larger (e.g., on a laptop display 310 or large desk display 312). Alternatively, priority for display may be given to those visual elements of most importance to a configured usability map (desired outcomes).

As the display size increases, elements may be added to the display in priority order, based on desired outcomes/interactivity pre-configured in the usability map or other format. Thus the elements 314 may be added for tablet horizontal displays 306 or tablet vertical displays 308 or larger; the element 316 may be added for laptop displays 310 or larger; and the elements 318 may be added for large desk displays 312.

Figure 4:
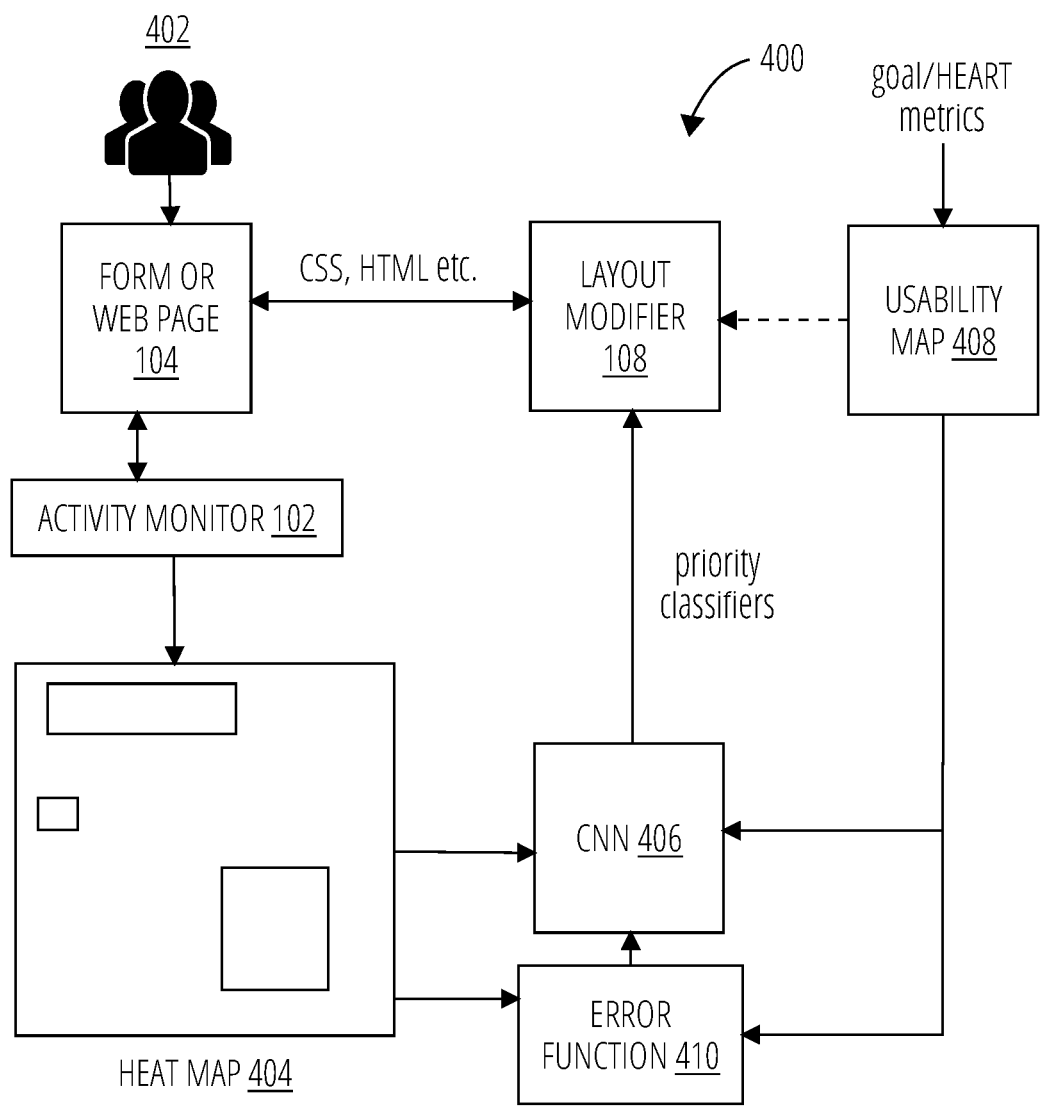
FIG. 4 depicts a system 400 in accordance with one embodiment.

FIG. 4 depicts a system 400 in one embodiment. The system 400 comprises a one or more users 402 interacting with a form or web page 104. The engagement of the users 402 is tracked by an activity monitor 102 (any of a number of commercial activity tracking tools can perform this function) that generates a heat map 404 for input to a convolutional neural network (CNN 406) trained with usability maps 408 for different desired engagement outcomes. The CNN 406 or other machine learning model is adapted ('learns') based on an error function 410 on the heat map 404 and usability map 408 or maps. Machine memory configurations that may be utilized for usability map 408 include, for example, empathy maps, customer journey maps, experience maps, and service blueprints.

In one embodiment the usability maps 408 are themselves heat maps. Such embodiments may enable efficiencies including that the layout modifier 108 may not need to input the usability maps 408 and may operate instead based on the priority classifiers for visual elements received from the CNN 406. Another potential advantage of these embodiments is that the CNN 406 may be trained with heat maps for different stages of user engagement with a page or form, and may prioritize the placement of visual elements of the page or form differently depending on the stage. Heat maps of the training set may be tagged with the stage of engagement to which they apply (e.g., initial engagement, after onboarding, and different stages of purchasing or decision making or some other final outcome). The priority classifiers generated in response to a particular heat map 404 input may thus vary based on a stage of user engagement (in a multistage engagement process).

The CNN 406 generates priority classifiers to the layout modifier 108 (a number of known web page and form generation tools can perform this function), based on recognition of similar visual features (and/or differences) between the ideal usability maps 408 (that may take the form of predefined web page or form templates) it was trained on, and the input heat map 404.

Figure 5:
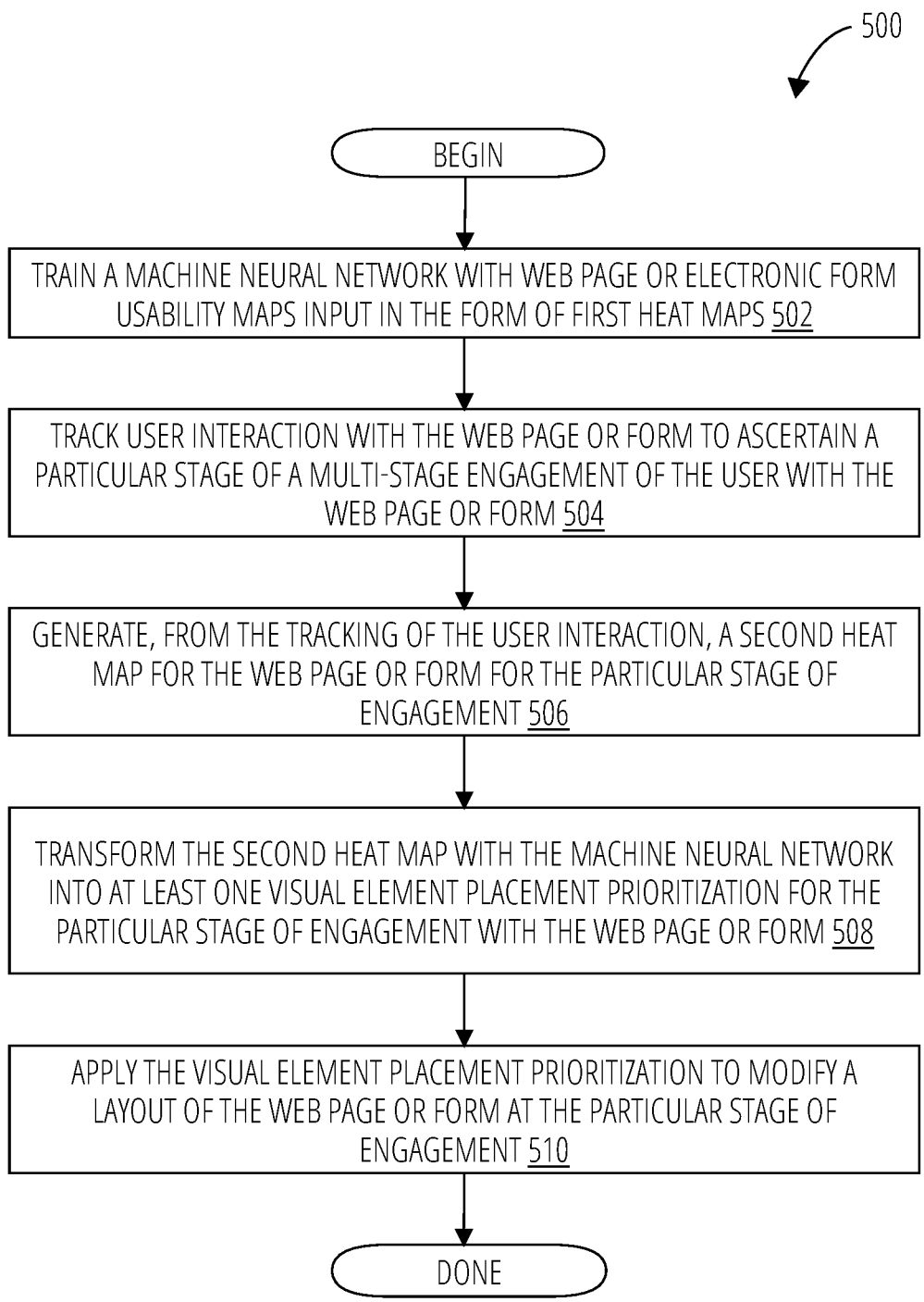
FIG. 5 depicts a process 500 in one embodiment.
Figure 6:
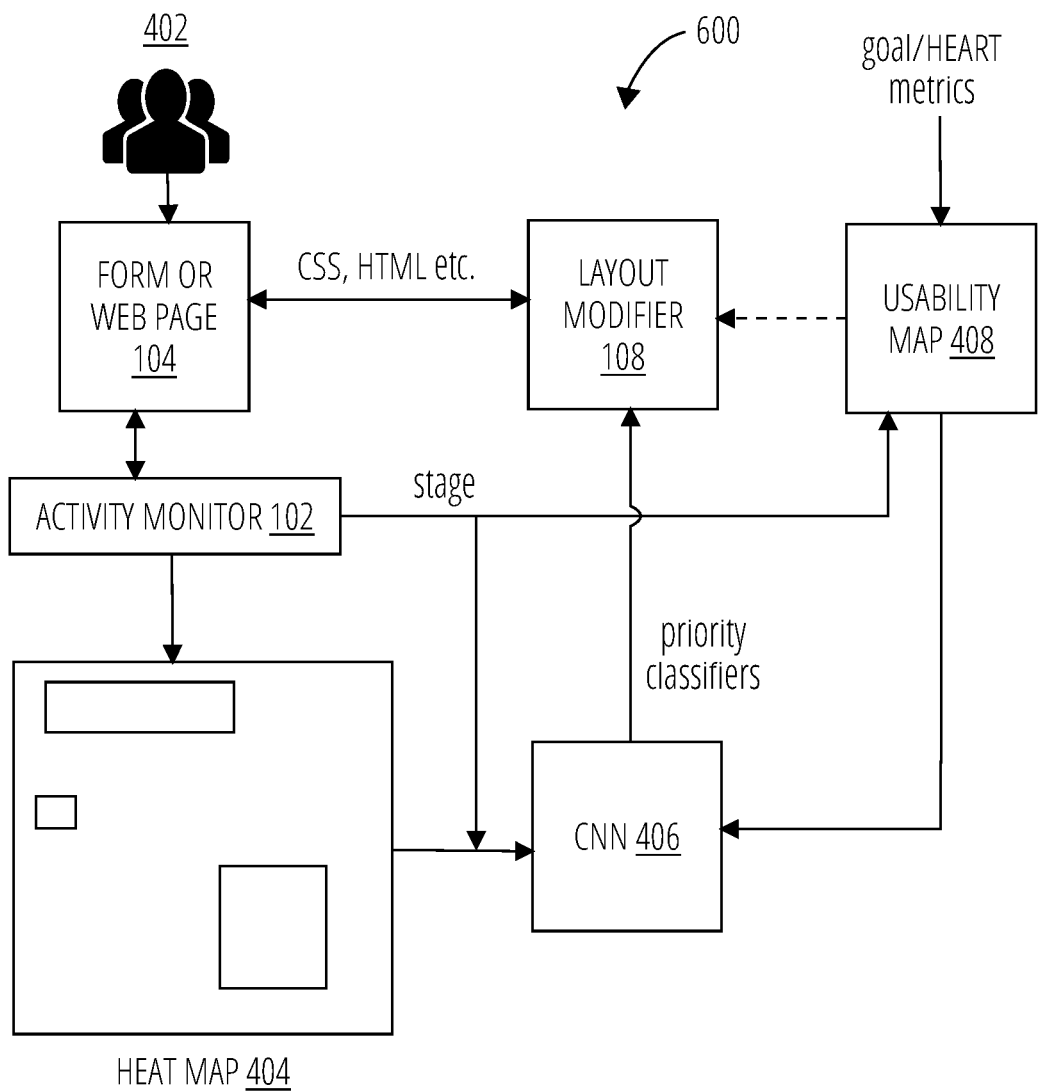

FIG. 5 depicts a process 500 in one embodiment. See also the system 600 of FIG. 6. In block 502, a machine neural network is trained with web page or electronic form usability maps input in the form of a set of heat maps (e.g., heat maps tagged with an interaction stage identifier). The training set may reflect preconfigured desired outcomes (goals) for the interaction overall, and/or for each stage of interaction. The usability maps 408 of the training set may reflect HEART metrics for the web page/form, for example.

In block 504, user interaction with the web page or electronic form is tracked to identify a particular stage of a multi-stage engagement of the user with the web page or electronic form. (The stage may also be tracked/identified using cookies, a user profile, or other known mechanisms). In block 506, by applying the tracking data, a heat map is generated for the web page or electronic form for the particular stage of engagement of the user. In block 508, the heat map is transformed by the machine neural network into at least one visual element placement prioritization for the particular stage of engagement with the web page or electronic form. The input tensor that includes the heat map may further include an interaction stage identifier. In block 510, process 500 the visual element placement prioritization is applied to modify a layout of the web page or electronic form at the particular stage of engagement for the particular user, and/or to evolve a layout template for the web page/form (this template may in fact be a usability map for the page/form) at the specific stage of engagement.

For example, based on a user's tracked interaction history (for which there be none for a first-time user), the system may ascertain that the user is exploring a product or service available via a web page, and has not yet subscribed or onboarded by signing up. For a user at this stage of engagement, the web page layout may be modified (based on tracking the visual elements that this and/or other user's at this stage prioritize) so that "About Us" and "Subscribe Now" elements have prioritized placement (placed in a visually more prominent or historically more interacted with area of the web page). Once the user subscribes or otherwise onboards, other visual elements may replace "About Us" and "Subscribe Now" for visual/interaction priority. For example, visual elements for joining particular affinity groups, or for ordering or previewing certain products or services, may be prioritized at a later stage of interaction with the web page. In fact the layout prioritization may reflect the particular user's interaction priorities, which may differ from those of the user base generally in important ways. For example the layout presented to a particular user may reflect not only a general layout template for that stage (the template evolved based on tracking many users at that stage), but may further reflect idiosyncrasies of that particular user's pattern of engagement at that stage, or with the web page generally.

Figure 7:
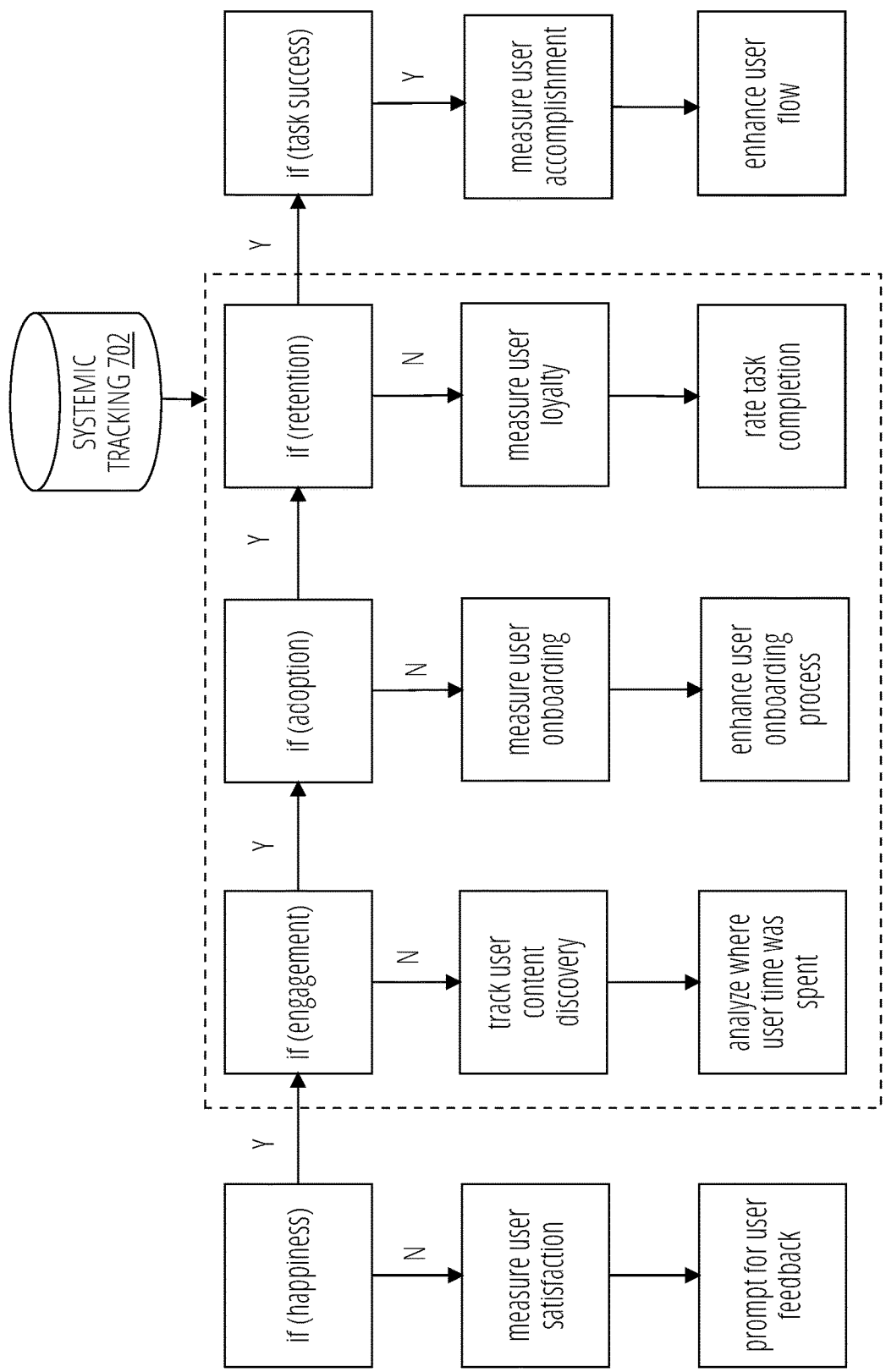
FIG. 7 depicts a system data flow in accordance with one embodiment.

FIG. 7 depicts a data flow in systems applying HEART metrics in accordance with one embodiment. The system may utilize systemic tracking 702 to track behaviors (expected vs. real interactions) across the wider system's user base.

Happiness tracks how users feel about the page or form. Happiness may be measured by user satisfaction surveys, ratings and reviews, and net promoter scores. Engagement measures how often are people use the page or form. Engagement may be measured by the number of visits per user per week, session length, or a key action, such as a number of uploads, downloads, or streams to per user per day.

Adoption measures how many people complete the onboarding process and become regular users. Adoption may be measured by a number of new users over a period of time or percentage of users engaging a new feature. Retention measures a percentage of users returning to the product and may be a measure of churn. Task success measures whether users achieve their goal or task for the page or form quickly and easily. Task success may be measured by factors such as efficiency (how long it takes users to complete the task) effectiveness (percent of tasks completed), and error rate.

Based on these metrics and a type of goal/outcome configured for the page, form, user, or combination thereof, the system may modify the layout of the page or form. The system may continuously test different iterations of the page or form across the user base (A/B tests), to measure that designs that are most effective at obtaining the desired outcomes (generally, or for certain categories of users).

Figure 8:
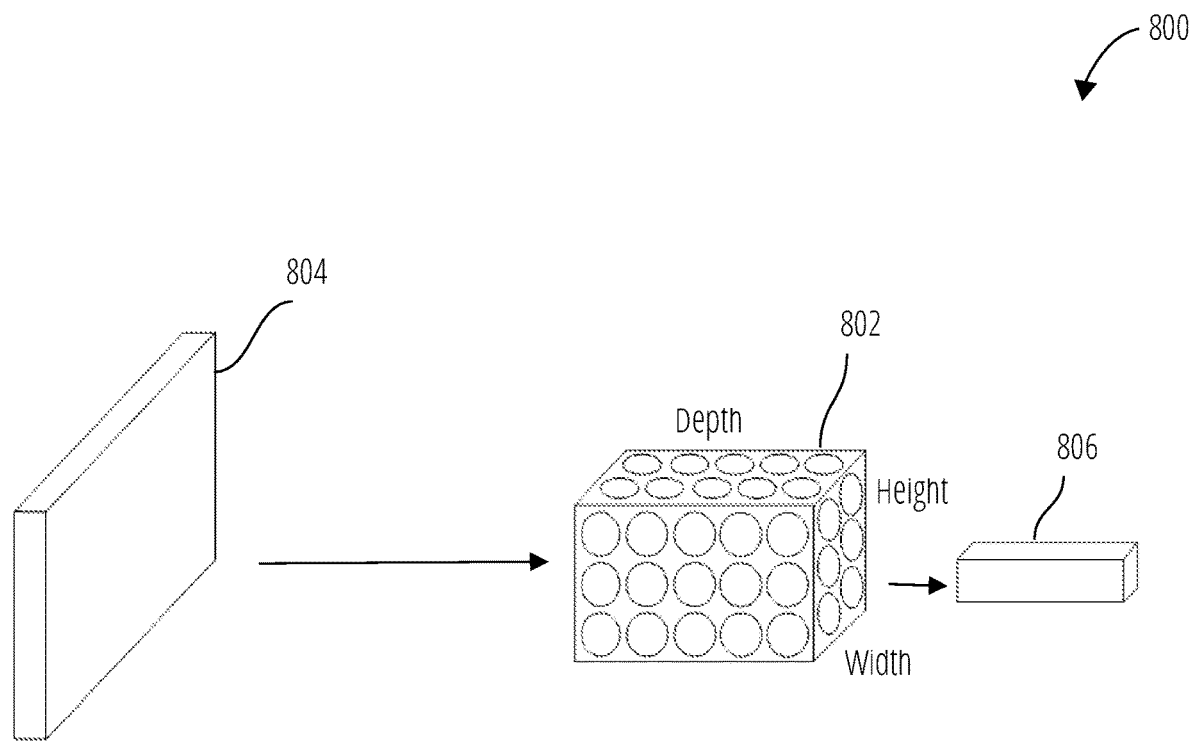
FIG. 8 depicts a convolutional neural network 800 in accordance with one embodiment.

FIG. 8 depicts an exemplary convolutional neural network 800 that may be trained and utilized in embodiments of the described systems. The convolutional neural network 800 comprises a three dimensional neuron configuration (width, height, depth), as depicted in convolutional layer 802. Layers of the convolutional neural network 800 transform a 3D volume of inputs to a 3D output volume of neuron activations. In this example, the input layer 804 encodes the image, therefore its width and height are configured to the dimensions of the image, and the depth of the 104 is configured to three (e.g., for Red, Green, and Blue channels). The convolutional layer 802 further transforms the outputs of the input layer 804. The output layer 806 transforms the outputs of the convolutional layer 802 into one or more classifications of the image content.

Figure 9:
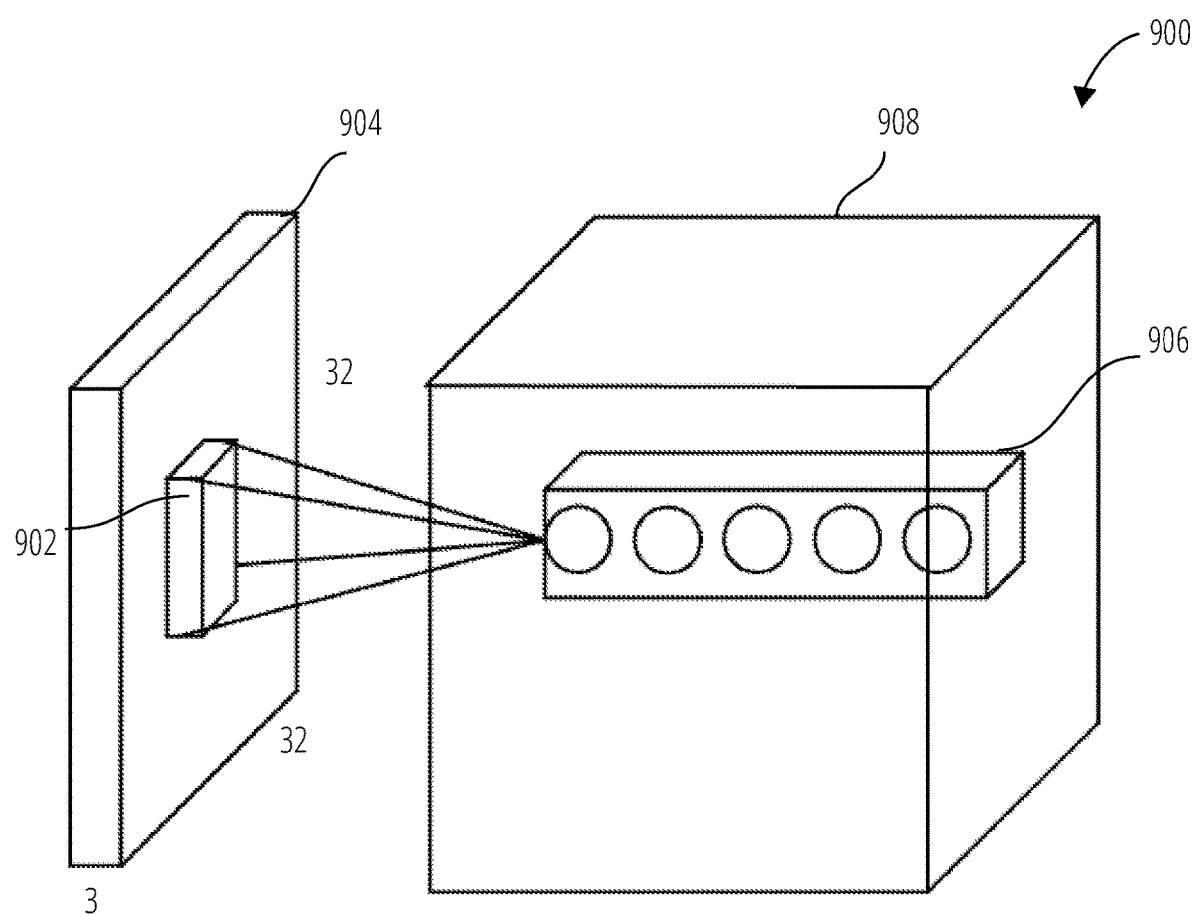
FIG. 9 depicts a convolutional neural network layers 900 in accordance with one embodiment.

FIG. 9 depicts an exemplary convolutional neural network layers 900 in more detail. An example subregion of the input layer region 902, from a tile 904 of the input layer 804 corresponding to a tile of an image, is transformed by a convolutional layer subregion 906 in the convolutional layer 908. The tile 904 in this example is 32×32 neurons (e.g., corresponding to a 32×32 tile 904), and three neurons deep (e.g., three color channels per pixel of the input region input to the tile 904). Each neuron in the convolutional layer 908 is coupled to a local region in the tile 904 spatially (e.g., in height and width), but to the full depth (i.e., to all color channels if the input is an image). There are multiple neurons (five in this example) along the depth of the convolutional layer subregion 906 that analyze the subregion of the input layer region 902 of the tile 904, in which each neuron of the convolutional layer subregion 906 may receive inputs from every neuron of the subregion of the input layer region 902.

Figure 10:
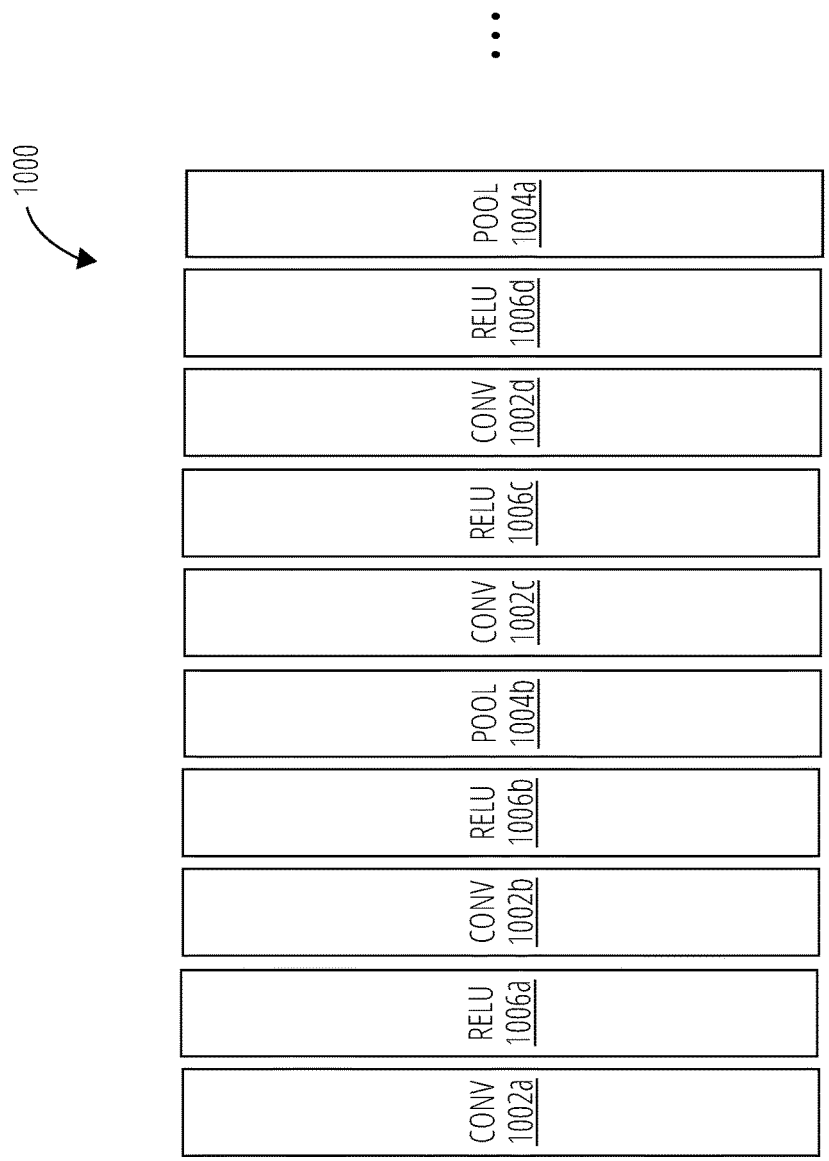
FIG. 10 depicts a VGG net 1000 in accordance with one embodiment.

FIG. 10 depicts a form of a CNN known as a VGG net 1000. The initial convolution layer 1002a stores the raw image pixels (e.g., for a heat map) and the final pooling layer 1004a determines the class scores (e.g., placement prioritizations). The intermediate convolution layers (convolution layer 1002b, convolution layer 1002c, and convolution layer 1002d) and rectifier activations (RELU layer 1006a, RELU-layer 1006b, RELUlayer 1006c, and RELUlayer 1006d) and intermediate pooling layers (pooling layer 1004b, pooling layer 1004a) along the processing path are also depicted.

The VGG net 1000 replaces the (often large) single-layer filters of basic CNNs with multiple smaller-sized (e.g., 3×3) filters in series. With a given receptive field (the effective area size of the input image), multiple stacked smaller-size filters may perform better at image feature classification than a single layer with a larger filter size, because multiple non-linear layers increase the depth of the network which enables it to learn more complex features. In a VGG net 1000 each pooling layer may be small, e.g., 2×2.

Figure 11:
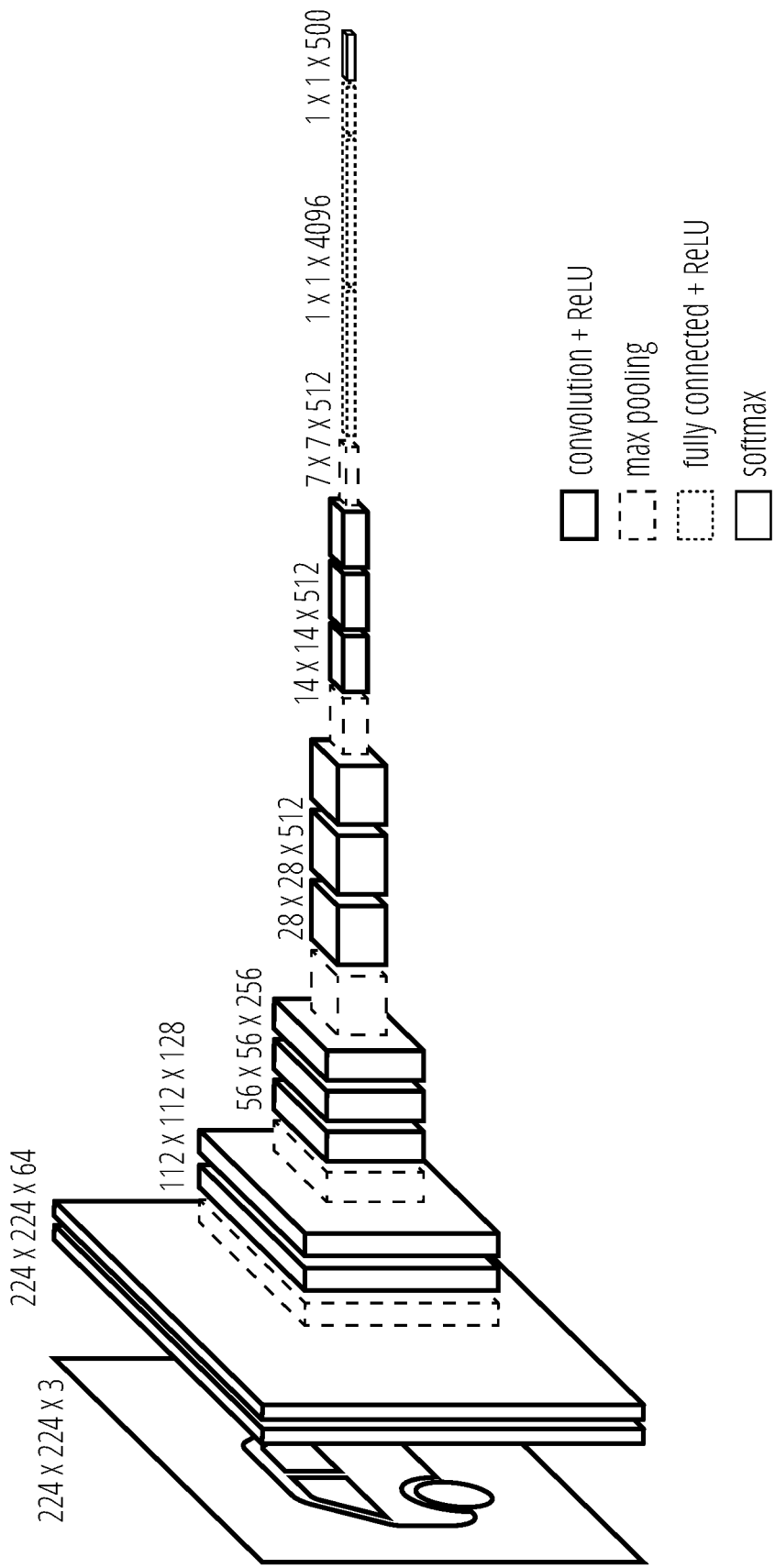
FIG. 11 depicts a VGG network architecture known as VGG16 in one embodiment.

FIG. 11 depicts a VGG network architecture known as VGG16 in one embodiment. The model achieves 92.7% top-5 test accuracy on ImageNet, a dataset of millions images belonging to thousands of classes. VGG16 utilizes multiple 3×3 kernel-sized filters in a series of convolutional layers.

The input in this example is a 224×224 RGB image. The image is passed through a stack of convolutional (cony) layers, each with filters of a 3×3 receptive field. In one configuration, the model also utilizes 1×1 convolution filters to provide a linear transformation of the input channels (followed by a non-linearity layer). The convolution stride is fixed to 1 pixel; the spatial padding is set such that the spatial resolution is preserved after convolution, i.e. the padding is 1-pixel for the 3×3 cony layers. Spatial pooling is carried out by five max- pooling layers, which follow some of the cony layers (not all the cony layers are followed by max-pooling). Max-pooling is performed over a 2×2 pixel window, with stride 2.

Three fully connected (FC) layers follow a stack of convolutional layers (which has a different depth in different configurations of the model). The first two FC layers comprise 4096 channels each. The third performs 1000-way ILSVRC classification and thus comprises one channel per class. The final layer is a Softmax layer.

Hidden layers are equipped with rectification (ReLU) non-linearity. Most VGG16 configurations do not utilize Local Response Normalisation (LRN), as such normalization does not improve the performance but incurs increased memory consumption and computation time.

Figure 12:
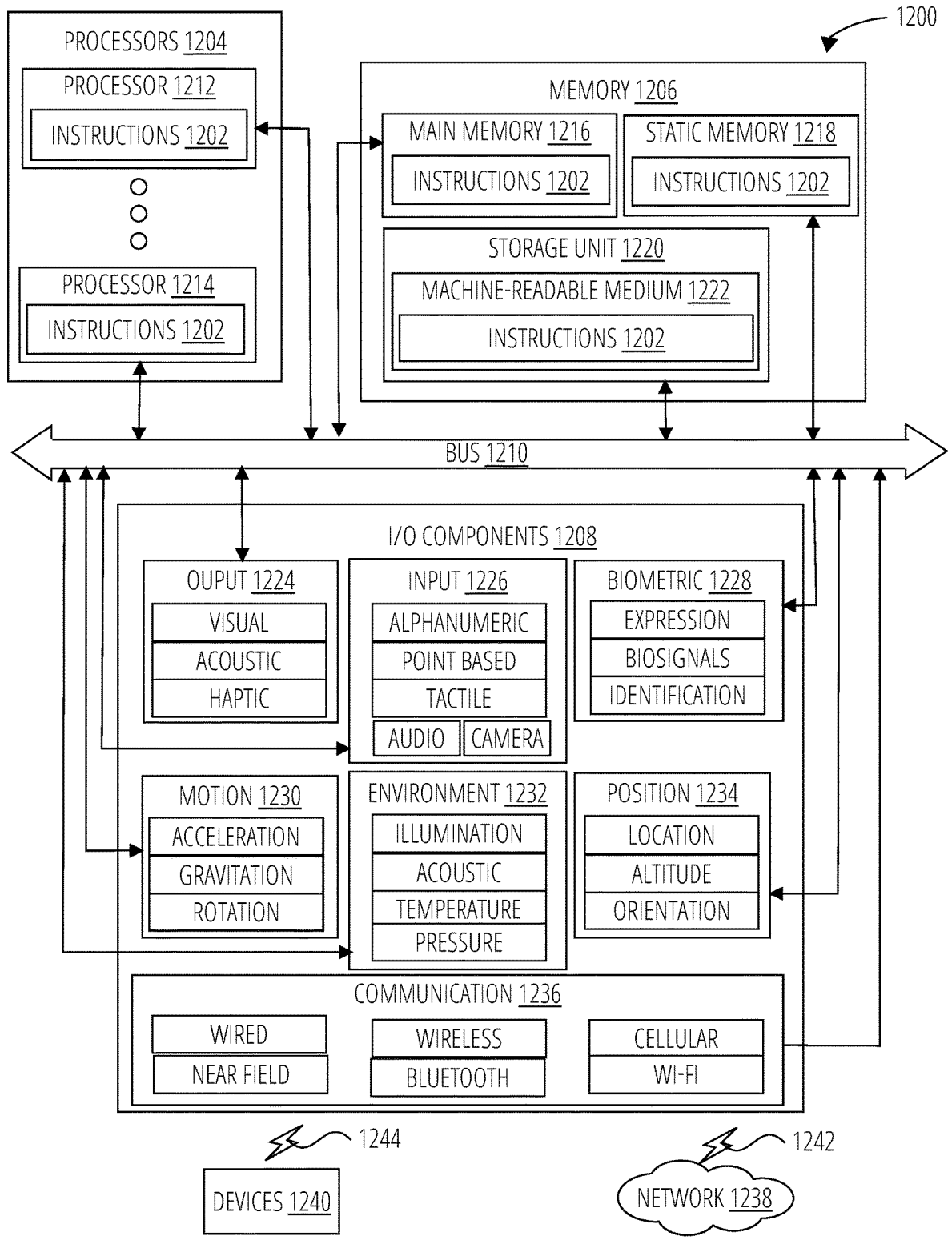
FIG. 12 illustrates a diagrammatic representation of a machine 1200 in the form of a computer system within which a set of instructions may be executed for causing the machine to perform any one or more of the methodologies discussed herein, according to an example embodiment.

FIG. 12 depicts a diagrammatic representation of a machine 1200 in the form of a computer system within which logic may be implemented to cause the machine to perform any one or more of the mechanisms disclosed herein, according to an example embodiment.

Specifically, FIG. 12 depicts a machine 1200 comprising instructions 1202 (e.g., a program, an application, an applet, an app, or other executable code) for causing the machine 1200 to implement any one or more of the components or actions described herein. For example the instructions 1202 may cause the machine 1200 to implement any of the components of system 100, system 400, system 600, VGG net 1000, and any or all of the actions depicted for process 500. The instructions 1202 configure a general, non-programmed machine into a particular machine 1200 programmed to implement said components and/or actions.

In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1202, sequentially or otherwise, that specify actions to be taken by the machine 1200. Further, while only a single machine 1200 is depicted, the term "machine" shall also be taken to include a collection of machines that individually or jointly execute the instructions 1202 to perform any one or more of the methodologies or subsets thereof discussed herein.

The machine 1200 may include processors 1204, memory 1206, and I/O components 1208, which may be configured to communicate with each other such as via one or more bus 1210. In an example embodiment, the processors 1204 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 1212 and processor 1214) to execute the instructions 1202. The term "processor" is intended to include multi-core processors that may comprise two or more independent processors (sometimes referred to as "cores") that may execute instructions contemporaneously. Although FIG. 12 depicts multiple processors 1204, the machine 1200 may include a single processor with a single core, a single processor with multiple cores (e.g., a multi-core processor), multiple processors with a single core, multiple processors with multiples cores, or any combination thereof.

The memory 1206 may include one or more of a main memory 1216, a static memory 1218, and a storage unit 1220, each accessible to the processors 1204 such as via the bus 1210. The main memory 1216, the static memory 1218, and storage unit 1220 may be utilized, individually or in combination, to store the instructions 1202 embodying any one or more of the functionality described herein. The instructions 1202 may reside, completely or partially, within the main memory 1216, within the static memory 1218, within a machine-readable medium 1222 within the storage unit 1220, within at least one of the processors 1204 (e.g., within the processor's cache memory), or any suitable combination thereof, during execution thereof by the machine 1200.

The I/O components 1208 may include a wide variety of components to receive input, provide output, produce output, transmit information, exchange information, capture measurements, and so on. The specific I/O components 1208 that are included in a particular machine will depend on the type of machine. For example, portable machines such as mobile phones will likely include a touch input device or other such input mechanisms, while a headless server machine will likely not include such a touch input device. It will be appreciated that the I/O components 1208 may include many other components that are not shown in FIG. 12. The I/O components 1208 are grouped according to functionality merely for simplifying the following discussion and the grouping is in no way limiting. In various example embodiments, the I/O components 1208 may include output components 1224 and input components 1226. The output components 1224 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 1208 may include biometric components 1228, motion components 1230, environmental components 1232, or position components 1234, among a wide array of possibilities. For example, the biometric components 1228 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 may include acceleration sensor components (e.g., accelerometer), gravitation sensor components, rotation sensor components (e.g., gyroscope), and so forth. The environmental components 1232 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1234 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1208 may include communication components 1236 operable to couple the machine 1200 to a network 1238 or devices 1240 via a coupling 1242 and a coupling 1244, respectively. For example, the communication components 1236 may include a network interface component or another suitable device to interface with the network 1238. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1240 may be another machine or any of a wide variety of peripheral devices (e.g., a peripheral device coupled via a USB).

Moreover, the communication components 1236 may detect identifiers or include components operable to detect identifiers. For example, the communication components 1236 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (i.e., memory 1206, main memory 1216, static memory 1218, and/or memory of the processors 1204) and/or storage unit 1220 may store one or more sets of instructions and data structures (e.g., software) embodying or utilized by any one or more of the methodologies or functions described herein. These instructions (e.g., the instructions 1202), when executed by processors 1204, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

In various example embodiments, one or more portions of the network 1238 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1238 or a portion of the network 1238 may include a wireless or cellular network, and the coupling 1242 may be a Code Division Multiple Access (CDMA) connection, a Global System for Mobile communications (GSM) connection, or another type of cellular or wireless coupling. In this example, the coupling 1242 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1202 and/or data generated by or received and processed by the instructions 1202 may be transmitted or received over the network 1238 using a transmission medium via a network interface device (e.g., a network interface component included in the communication components 1236) and utilizing any one of a number of well-known transfer protocols (e.g., hypertext transfer protocol (HTTP)). Similarly, the instructions 1202 may be transmitted or received using a transmission medium via the coupling 1244 (e.g., a peer-to-peer coupling) to the devices 1240. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1202 for execution by the machine 1200, and/or data generated by execution of the instructions 1202, and/or data to be operated on during execution of the instructions 1202, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS 100 system
102 activity monitor
104 form or web page
106 machine learning model
108 layout modifier
200 heat map
202 element set
204 element set
206 element set
208 element set
210 element set
302 elements
304 mobile phone display
306 tablet horizontal display
308 tablet vertical display
310 laptop display
312 large desk display
314 elements
316 element 318 elements
400 system
402 users
404 heat map
406 CNN
408 usability map
410 error function
500 process
502 block
504 block
506 block
508 block
510 block
600 system
702 systemic tracking
800 convolutional neural network
802 convolutional layer
804 input layer
806 output layer
900 convolutional neural network layers
902 subregion of the input layer region
904 tile
906 convolutional layer subregion
908 convolutional layer
1000 VGG net
1002a convolution layer
1002b convolution layer
1002c convolution layer
1002d convolution layer
1004a pooling layer
1004b pooling layer
1006a RELU layer
1006b RELUlayer
1006c RELUlayer
1006d RELUlayer
1200 machine
1202 instructions
1204 processors
1206 memory
1208 I/O components
1210 bus
1212 processor
1214 processor
1216 main memory
1218 static memory
1220 storage unit
1222 machine-readable medium
1224 output components
1226 input components
1228 biometric components
1230 motion components
1232 environmental components
1234 position components
1236 communication components
1238 network
1240 devices
1242 coupling
1244 coupling Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine- executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A method comprising:
    generating a heat map encoding of user interaction with a web page or electronic form, wherein the heat map comprises a quantification and localization of engagement frequency with a spatial layout of the web page or electronic form;
    transforming the heat map through multiple layers of a convolutional neural network into at least one visual element placement prioritization for the web page or electronic form; and
    applying the visual element placement prioritization to modify the spatial layout of the web page or electronic form.

2. The method of claim 1, further comprising:
    applying a usability map for particular user engagement scenarios with the web page or form to influence the visual element placement prioritization that is a lied to modify the layout of the web page or form.

3. The method of claim 2, wherein the usability map comprises a heat map.

4. The method of claim 2, the usability map based on HEART metrics.

5. The method of claim 2, the usability map based on a preconfigured desired outcome of the user interaction.

6. The method of claim 2, further comprising:
    applying the visual element placement prioritization to modify the usability map.

7. The method of claim 1, further comprising combining an interaction stage identifier with the heat map to form an input tensor to the machine neural network.

8. The method of claim 1, further comprising:
    training the layers of the neural network with heat maps tagged with an identifier of a stage of the user interaction with the web page or electronic form.

9. The method of claim 1, wherein the neural network is a VGGnet.

10. A method comprising:
    training a convolutional neural network with web page or electronic form usability maps input in the form of first heat maps comprising quantifications and localizations of desired user engagement frequency at a particular stage of multi-stage engagement with a spatial layout of the web me or electronic form;
    tracking user interaction with the web page or form to ascertain the particular stage of a multi-stage engagement of the user with the web page or electronic form;
    generating, from the tracking of the user interaction, a second heat map for the web page or electronic form for the particular stage of engagement, the second heat map comprising quantifications and localizations of actual user engagement frequency with the spatial layout of the web page or electronic form;
    transforming the second heat map and particular stage of engagement with the convolutional neural network into at least one visual element placement prioritization for the particular stage of engagement with the web page or electronic form; and applying the visual element placement prioritization to modify the spatial layout of the web page or electronic form at the particular stage of engagement.

11. A system comprising:
    at least one processor; and
    a memory comprising instructions that when executed by the at least one processor result in:
    generating a heat map encoding of user interaction with a web page or electronic form, the heat map comprising a quantification and localization of the user interaction frequency with a spatial layout of the web page or electronic form;
    transforming the heat map through convolutional layers of a machine neural network into at least one visual element placement prioritization for the web page or electronic form; and
    applying the visual element placement prioritization to modify a layout of the web page or electronic form.

12. The system of claim 11, the instructions when executed by the at least one processor further resulting in:
    training the convolutional layers of the neural network with a usability map for the web page or form.

13. The system of claim 12, wherein the usability map comprises a heat map.

14. The system of claim 12, the usability map based on HEART metrics.

15. The system of claim 12, the usability map based on a preconfigured outcome for the user interaction.

16. The system of claim 12, the instructions when executed by the at least one processor further resulting in:

applying the visual element placement prioritization to modify a template for the web page or form.

17. The system of claim 11, the instructions when executed by the at least one processor further resulting in::
training the convolutional layers of the machine neural network with usability maps for different stages of user interaction with the web page or form.

18. The system of claim 11, the instructions when executed by the at least one processor further resulting in:
training the convolutional layers of the machine neural network with heat maps tagged with an identifier of a stage of the user interaction with the web page or electronic form.

* * * * *